Patented Mar. 19, 1929.

1,705,495

UNITED STATES PATENT OFFICE.

EMIL E. NOVOTNY, OF LOGAN, PENNSYLVANIA, AND DONALD S. KENDALL, OF LITTLE FALLS, NEW JERSEY, ASSIGNORS TO JOHN STOGDELL STOKES, OF HUNTINGDON VALLEY POST OFFICE, PENNSYLVANIA.

SYNTHETIC RESIN COMPOSITION.

No Drawing. Original application filed September 17, 1921, Serial No. 501,273. Divided and this application filed January 25, 1927. Serial No. 163,553.

This invention relates to synthetic resins and the process of making the same and has particular application to the manufacture of furfural-phenol condensation products adapted especially for molding purposes and which, when subjected to the action of heat, or heat and pressure, will undergo chemical reaction and assume a hard, set and infusible form.

The present application is a division of our co-pending application, Serial No. 501,273, filed September 17, 1921, for synthetic resin compositions, and is also in the nature of an improvement on the invention forming the subject matter of our patent, No. 1,398,146, dated Nov. 22, 1921.

In the present instance, it is our purpose to produce a synthetic resin in the nature of a condensation product by treating a mixture of certain preferred proportions of furfural and a phenolic body with a suitable basic catalyst to form, when subjected to a pre-determined degree of heat for a specified time, a fusible resin, and then subsequently treating this fusible resin with a hardening agent, so that the mass will assume its final infusible state under the action of additional head, or heat and pressure.

To produce a resin of this character on a successful and commercial basis, it is necessary that the process be such that there shall be no appreciable loss of ingredients, such as the phenol and furfural during manufacture, and that the smallest or minimum amount of basic catalyst, commensurate with the thorough condensation or chemical union of the phenol and furfural, be employed.

In the practice of our invention, we have found that where a relatively large quantity of basic catalyst is employed, it produces an exceedingly deficient and uncommercial product, or one which is porous, which will crumble or break easily, and which lacks mechanical and dielectric strength. Furthermore, when a relatively large amount of catalyst is employed, a violent reaction takes place under the application of heat which is difficult to control, and the final product is un-uniform as it consists of a large quantity of high resin polymers, together with a large quantity of uncombined ingredients, such as the phenolic bodies and furfural. Furthermore, such final product will usually be found to have incorporated therein, an excess of catalyst which is detrimental for technical and industrial uses.

It is quite essential that the proper ratio or proportion of the phenol and furfural be maintained during the initial reaction, so that a uniform product will be attained, and that a substantially complete combination be had of the furfural with phenol, and to this end, in the practice of our invention, we employ a return condenser or similar apparatus to insure that any uncombined reagents escaping from the digester in which the reaction is taking place, shall be returned to the reaction vessel for combination with the reacting mass. This is not only economical, but insures a production of a mechanically strong product having high dielectric properties.

Furthermore, with our process, we produce a successful and commercial product at a temperature below that in which phenol and furfural will combine in the absence of a catalytic agent, as described in our aforesaid co-pending case Serial No. 501,273, filed September 17, 1921, and such reaction takes place in a relatively short period of time.

Additionally, when we use a hardening agent such as hexamethylenetetramin of or furfuramid prior to the final heating or molding, the fusible resin previously formed by the reaction of a furfural, phenol and the basic catalyst may be more quickly and speedily brought to its infusible condition, and at a relatively low degree of temperature.

In order to give a complete understanding of our invention, we will now describe a certain preferred example thereof.

We initially mix with 100 parts of phenol and 75 parts of furfural, a suitable basic catalyst, such as 2% of potassium carbonate of the phenol weight. The liquid-like mixture formed of these three ingredients is then placed in a suitable container or vessel and subjected to the action of a relatively low degree of heat, say from 250° to 300° F. The vessel is preferably arranged in conjunction with a return condenser so that the vapors may be condensed and returned to the mixture-containing vessel, thereby avoiding loss of product. After the heat has been applied for the determined length of time for example for approximately two hours, the water of condensation and any excess phenol is removed in the usual manner, as by evaporation, thus leaving within the vessel or container a fusible, soluble mass of substantially anhydrous resin, the melting point of which is about 240° F. This fusible resin when removed, may be ground into powdered form or placed in a solution with alcohol or other suitable solvent, and used for desired purposes, such as for impregnation or incorporation with suitable filling material, or in the manufacture of varnishes or the like. This fusible resin when employed, for example, in conjunction with a filler in molding an article, will react and assume its infusible, insoluble state when subjected to a relatively high temperature of say from 420° to 450° F. for a period of approximately one hour. If, however, it is desired to obtain quick molding, using a relatively low degree of heat, we add, before the molding operation, to the fusible synthetic resinous mass, a suitable amount of a hardening and accelerating agent such as 5 to 20 parts of hexamethylenetetramin, or from 8 to 40 parts of furfuramid, these proportions being relative to the weight of the resin in the mass. When the hardening agent or accelerating agent has been so added, instead of employing the high temperature of from 240° to 450° F. and of heating the mass for the relatively long period of one hour, the molding and setting of the mass to infusibility and insolubility may be accomplished by employing heat at a temperature of from 250° to 350° F. for a period of about from 1 to 10 minutes. Therefore, where speed is required, in per diem production, it is preferable to employ the hardening and accelerating agent.

If it is desired to further quicken or accelerate the reaction of the phenolic resin, and to increase the insolubility thereof, we have found that the addition of a small amount of para-phenylene-diamine, for instance, in proportion of 1% to the amount of resin, will have the desired effect. It will, of course, be understood that our furfural-phenol product may be used in conjunction with fillers of various sorts, and with the addition of pigments and dyes of various colors.

Where we have herein used the word a phenol, we wish this to be understood as including, or being equivalent of cresol, resorcinol, naphthol, and substances having similar characteristics; and wherein we have used the term "furfural", we wish this to be understood as embracing as equivalent any derivative of or any product of compound containing or engendering furfural and which is useful or adapted for our purpose.

What we claim is:

1. A potentially reactive synthetic resin comprising a soluble, fusible, anhydrous product of a phenol, an active furane body and a basic catalyst.

2. A potentially reactive synthetic resin comprising a soluble, fusible, anhydrous product of a phenol, an active furane body and potassium carbonate as a basic catalyst.

3. A potentially reactive synthetic resin comprising a soluble, fusible, anhydrous product of a phenol, an active furane body and a basic catalyst, said product being capable of further reaction under the application of additional heat to produce a homogeneous infusible and substantially insoluble body.

4. A potentially reactive synthetic resin comprising a soluble, fusible product of a phenol, furfural and a basic catalyst, said product being substantially free from uncombined phenol and furfural.

5. A potentially reactive synthetic resin comprising a soluble, fusible product of a phenol, furfural and a basic catalyst, said product being substantially free from uncombined phenol and furfural and capable of further reaction under the application of additional heat to produce a homogeneous infusible and substantially insoluble body.

6. A potentially reactive synthetic resin comprising a soluble, fusible, potentially reactive product of a phenol, furfural and a relatively small amount of basis catalyst, the quantity of said catalyst being just sufficient to cause the phenol and furfural to combine.

7. The process of making a synthetic resin composition which comprises heating a mixture of phenol, furfural and a relatively small amount of a basic catalytic agent to produce a fusible resin, the phenol and furfural being in such proportions as to insure substantially complete combination of the phenol and furfural, and then further subjecting said fusible resin to the action of heat in the presence of a hardening agent to produce an infusible, homogeneous, insoluble body.

8. The herein described process of making synthetic resin composition which comprises mixing a phenol, furfural and a relatively small amount of a basic catalyst, and heating the mixture to produce a fusible resin, the phenol and furfural being in such proportions as to insure substantially complete combination of the phenol and furfural, and then heating said fusible resin in the presence of an active methylene body to convert the resin into an infusible, homogeneous, insoluble body.

9. The herein described method of making a potentially reactive synthetic resin which comprises mixing a phenol and furfural with a relatively small amount of a basic catalyst, the phenol and furfural being in such proportions as to insure substantially complete combination of the phenol and furfural, subjecting the mixture to heat to combine substantially all the phenol and furfural, and remove from the mass any excess reagents and synthetic water, thereby producing a potentially reactive resin-like mass which is fusible and soluble and capable upon the subsequent application of heat of assuming a homogeneous, infusible, insoluble form.

10. The herein described process of making a potentially reactive synthetic resin which comprises subjecting a mixture of a phenol, furfural and a relatively small amount of a basic catalyst to the action of heat to form a potentially reactive, fusible resin, the phenol and furfural being in such proportions as to insure substantially complete combination of the phenol and furfural, and then subjecting said resin to the combined action of heat and pressure to produce a solid, homogeneous, insoluble, infusible body.

11. The process of making a synthetic resin product which comprises heating a mixture of a phenol and furfural in the presence of a relatively small amount of a basic catalyst, the phenol and furfural being in such proportions as to insure substantially complete combination of the phenol and furfural, then adding a hardening agent and a filling material, and subjecting the constituent mass to heat and pressure to shape the product and to produce an infusible, homogeneous, insoluble body.

12. The process of making a synthetic resin product which comprises heating a mixture of a phenol and furfural in the presence of a relatively small amount of a basic catalyst, the phenol and furfural being in such proportions as to insure substantially complete combination of the phenol and furfural, then adding an active methylene body as a hardening agent, adding a filling material, and subjecting the constituent mass to heat and pressure to shape the product and to produce an infusible, homogeneous, insoluble body.

13. The process of making a synthetic resin product which comprises heating a mixture of a phenol and furfural in the presence of a relatively small amount of a basic catalyst, the phenol and furfural being in such proportions as to insure substantially complete combination of the phenol and furfural, then adding hexamethylenetetramin as a hardening agent, adding a filling material and subjecting the constituent mass to pressure to shape the product, and to heat to produce an infusible, homogeneous, insoluble body.

14. The process of making a potentially reactive synthetic resin which comprises heating a mixture of a phenol and furfural, the phenol and furfural being in such proportions as to insure substantially complete combination between the same in the presence of a relatively small amount of a basic catalytic agent, to cause a reaction between the products, and removing any synthetic water evolved during the reaction.

15. A composition comprising, incorporated with hexamethylene tetramine, the resinous reaction products of furfural and a phenol in the presence of a fixed alkali, which resinous products are suitable for use as a binder in molding operations and capable of hardening with not over 10% of hexamethylene tetramine.

16. A material comprising the fusible resinous reaction products of furfural and a phenol in the presence of an alkali metal carbonate, and not over 10% of hexamethylenetetramine, such material being moldable under heat and pressure to produce a substantially non-blistered article.

17. A process of making a resinous body suitable for molding operations which comprises reacting with 3 mols. of furfural upon more than 3 mols. but not substantially over 4 mols. of phenol, in the presence of a smaller amount of a fixed alkali, and continuing the reaction until at least the major part of the furfural has been converted into a fusible soluble resin.

18. A process of making a resin suitable for molding operations which comprises reacting with about 3 mols. of furfural on about 4 mols. of a phenolic body in the presence of a smaller amount of a fixed alkali, and continuing the reaction until at least the major part of the furfural has been converted into a fusible soluble resin.

19. A process of making a resinous body suitable for molding operations which comprises reacting with about 3 mols. of furfural upon over 4 mols. but not substantially over 4 mols. of phenol in the presence of a smaller amount of a fixed alkali, and continuing the reaction until at least the major part of the furfural has been converted into a fusible soluble resin and hardening the said resin by heating with hexamethylenetetramine.

20. The process of making resinous material which comprises heating a reactive phenolic body, in the presence of a fixed alkali, with a resinifying agent comprising furfural, and incorporating hexamethylenetetramine with the resulting fusible resinous product without previous neutralization of fixed alkali.

21. In the manufacture of plastics, the steps which comprise reacting with furfural upon a phenolic body, in the presence of a fixed alkali catalyst in such proportions as to form a fusible soluble resin, incorporating such resin with not substantially more than 10% of its weight of a methylene hardening agent, and molding a material containing such mixture under pressure to form a substantially non-blistered article.

22. In the manufacture of plastics with the aid of furfural, the steps which comprise reacting with 3 mols. of furfural on over 3 mols. but not substantially over 4 mols. of a phenol, in the presence of a fixed alkali catalyst and incorporating a hardening agent including hexamethylene-tetramine with the resulting fusible product and thereafter hardening in the presence of a fixed alkali.

23. A process which comprises reacting on phenol with furfural in the presence of fixed alkali to make a fusible resin and incorporating hexamethlylene-tetramine therewith in amount not substantially over 10%, such amount being sufficient to harden said resin and form a substantially infusible non-blistered product.

24. A process of making a resinous body which comprises reacting with furfural, in the presence of a fixed alkali on a reactive phenolic body, the molar ratio being below 1:1 but not substantially below 3:4.

25. A composition containing a phenol-furfural resin formed in an alkaline medium, and containing hexamethylene-tetramine, such mixture being capable, when heated under molding conditions, of setting to a substantially infusible molded product without substantial blistering, within not over five minutes.

26. A composition comprising the resinous reaction products of furfural and a phenol, formed in the presence of a fixed alkali, which resinous products are suitable for use as a binder in molding operations, incorporated with not substantially over 10% of a methylene hardening agent, in amount sufficient to harden the same and render the same infusible upon hot molding, without substantially blistering the article.

27. A process of making a resinous body which comprises reacting with furfural, in the presence of a fixed alkali on a reactive phenolic body, the molar ratio being not over 1:1 but not substantially below 3:4, incorporating an aldehyde-containing hardening agent with such resinous body, and molding a material containing such mixture.

28. A process of making a resin suitable for molding operations which comprises reacting with about 3 mols. of furfural on about 4 mols. of a phenolic body in the presence of a smaller amount of a fixed alkali, and continuing the reaction until at least the major part of the furfural has been converted into a fusible soluble resin, incorporating an aldehyde-containing hardening agent with such resin and molding a material containing such mixture.

Signed by DONALD S. KENDALL, at New York city, in the county and State of New York, the 18th day of Jan., 1927.

DONALD S. KENDALL.

Signed by EMIL E. NOVOTNY, at Philadelphia, in the county of Philadelphia and State of Pennsylvania, the 21st day of Jan., 1927.

EMIL E. NOVOTNY.